United States Patent [19]

Okuhara

[11] 4,082,923
[45] Apr. 4, 1978

[54] SEMICONDUCTOR SPEECH PATH SWITCH

[75] Inventor: Shinzi Okuhara, Fujisawa, Japan

[73] Assignee: Hitachi, Ltd., Japan

[21] Appl. No.: 517,003

[22] Filed: Oct. 22, 1974

[30] Foreign Application Priority Data

Oct. 27, 1973  Japan .................................. 48-120414

[51] Int. Cl.² ............................................. H04Q 3/52
[52] U.S. Cl. ............................ 179/18 GF; 340/166 R
[58] Field of Search ............... 179/18 GF; 340/166 R,
340/166 EL; 250/552, 553; 307/315, 117

[56] References Cited

U.S. PATENT DOCUMENTS

| | | | |
|---|---|---|---|
| 3,491,209 | 1/1970 | Relsted | 179/18 GF |
| 3,504,131 | 3/1970 | Slana et al. | 179/18 GF |
| 3,601,547 | 8/1971 | Potter | 179/18 GF |
| 3,720,792 | 3/1973 | Resta | 179/18 GF |
| 3,735,057 | 5/1973 | Bryan | 179/18 GF |
| 3,760,361 | 9/1973 | Leger et al. | 340/166 R |
| 3,826,873 | 7/1974 | Susi | 179/18 GF |
| 3,832,495 | 8/1974 | Hovagimyan et al. | 179/18 GF |
| 3,865,978 | 2/1975 | Hestad | 179/18 GF |

FOREIGN PATENT DOCUMENTS

| | | | |
|---|---|---|---|
| 253,570 | 11/1960 | Australia | 179/18 GF |
| 1,096,243 | 12/1967 | United Kingdom | 179/18 GF |

OTHER PUBLICATIONS

"PNPN Light Emitting Diode", IBM Technical Disclosure Bulletin, vol. 14, No. 4, Sept. 1971, pp. 1325, 1326.
SCR Manual, 4th Ed., General Electric, 1967–pp. 143, 144, 294, 295.

Primary Examiner—Thomas W. Brown
Attorney, Agent, or Firm—Craig & Antonelli

[57] ABSTRACT

A plurality of sets of thyristors, each set consisting of two thyristors connected in inverse parallel configuration, are arranged in the form of a matrix to provide a switch of balanced or unbalanced type. A control circuit is provided which feeds successive pulses or light energy whose repetition rate is higher than the frequency of the ac signal such as a ringing signal passing through the speech paths, to the thyristors at a crosspoint to be closed, during the time required for exchange operation. In this way, a speech path switch can be constituted of semiconductor elements and ringing, dialing and hooking signals can be treated together with speech signals.

17 Claims, 5 Drawing Figures

SEMICONDUCTOR SPEECH PATH SWITCH

This application is related to commonly assigned copending U.S. application Ser. No. 707,352, filed July 21, 1976 which is a continuation of U.S. application Ser. No. 484,237, filed June 28, 1974, now abandoned.

The present invention relates to a speech path switch constructed with semiconductor elements, for use chiefly in a telephone exchange.

In a conventional telephone exchange, the ringing signals, speech currents, dialing pulses and toll signals are sent through a crossbar switch as a typical example of mechanical contact switches, to suitable apparatus and then subjected to exchange. With the invention of an electronic exchange, however, the peripheral control circuits have been all fabricated with electronic devices and in order to decrease the size to improve the efficiency and to use economy it is also preferable to form the speech path switch electronically. In the past, gas discharge tubes were used to constitute an electronically operated speech path switch, but nowadays, with the development of semiconductor industry and especially of IC techniques, a switch consisting of semiconductor elements is more practicable.

Many attempts were made to fabricate a speech path switch for a exchange with semiconductor devices and most of the attempts used thyristors (or PNPN switches called SCR's). The thyristor is a very useful element for the realization of an electronically operated speech path switch of an exchange since it has a small impedance when conducting and a large resistance when cut off and since once it is turned on by a small gate current it continues to be conductive until the main current through it is externally interrupted, that is, it has a self-holding action. In the telephone exchange, the ringing signal (bell signal) is in the form of an alternating current having high voltage so that bidirectional currents have to flow through the exchange and although the circuit current is usually interrupted by dialing and hooking operations, the speech path switch must be kept closed during these operations.

There are speech path switches of a semiconductor type, capable of treating speech signal, dialing signals, hooking signals and ringing signals all together, comprising semiconductor switches having associated gate terminals, each being connected between two lines serving respectively as speech paths; gate current circuits having high impedances and connected with the gate terminals of the switches, which circuits can be rendered on and off in control; memory circuits to keep the gate current circuits in the on and off states; and control circuits to set and reset the memory circuits, wherein the gate current circuits are rendered on and off according to the set and reset operations of the control circuits so that the speech paths may be closed and opened. In such a semiconductor speech path switch, however, at least one memory circuit must be provided for each cross-point of the speech paths so that not only the structure of the speech path switch as a whole is complicated but also the cost of the switch is high. Further, in this speech path switch, the gate current must be kept flowing continuously and therefore the power consumption is accordingly considerable. They are the inevitable drawbacks of this type of semiconductor speech path switch.

The main object of the present invention is to provide a semiconductor speech path switch of simple structure, which can treat the speech signal, the dialing, hooking, and ringing signals together.

Another object of the present invention is to provide a semiconductor speech path switch which can operate with a small power consumption.

According to the present invention, there is provided a semiconductor speech path switch comprising semiconductor switches having associated gate terminals, each being connected between two lines serving respectively as speech paths; gate current circuits having high impedances and connected with the gate terminals of the semiconductor switches (or a luminescent element provided respectively for the semiconductor switches); and control circuits to render the gate current circuits (or the luminescent element) on and off, wherein the control circuits control the gate current circuits (or the luminescent element) to intermittently render them on and off at a repetition rate higher than the frequency of the current flowing through speech paths such as the ringing signal, dialing signal so that the speech paths at any desired cross-point may be closed and opened.

The foregoing objects and other objects as well as the characteristic features of the invention will become more apparent by the following description and the appended claims when read in conjunction with the accompanying drawings in which:

Before the explanation of the concrete embodiments of the present invention, another type of semiconductor speech path switch will be described with reference to FIG. 1.

Figure 1:
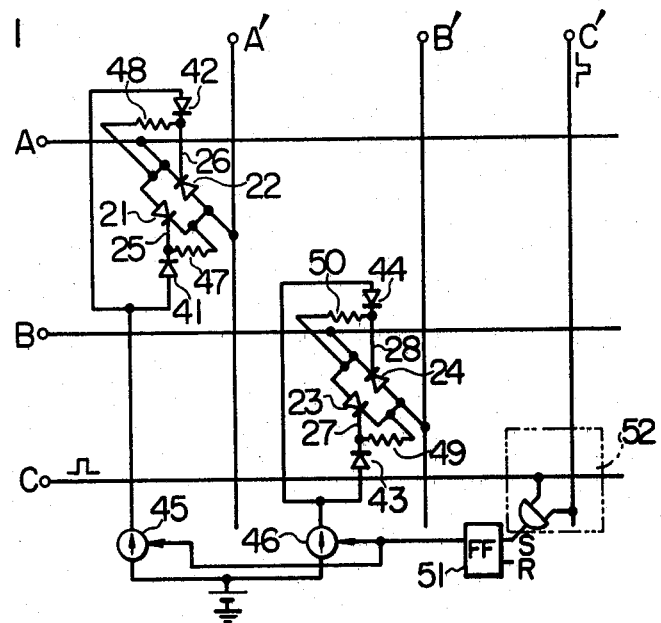
FIG. 1 shows another type of semiconductor speech path switch, in the unit thereof.

FIG. 1, for simplicity, shows only a balanced type cross-point having lines (A – A') and (B – B'). A plurality of units, each being equivalent to the circuit shown in FIG. 1, are arranged to form a matrix in order to provide a semiconductor speech path switch. In FIG. 1, thyristors 21 and 22 have their gates 25 and 26 connected through diodes 41 and 42 with a constant current gating current circuit or supply 45. In like manner, thyristors 23 and 24 have their gates 27 and 28 connected through diodes 43 and 44 with a constant current gating current circuit or supply 46. The gating current circuits 45 and 46 are connected with a memory 51 (represented as a flip-flop in the figure), which is in turn connected with a selecting circuit 52 which selectively sets and resets the memory 51 according to the logical product of the signals on selection paths C and C'. In this semiconductor speech path switch, the memory 51 is set by means of the selecting circuit 52 when pulse signals appear simultaneously on the selection paths C and C'. (The associated reset circuit is not shown in the figure.) The memory 51 is kept in the set state during a time required for exchange operation and the gating current circuits 45 and 46 continue to supply constant gate current for the thyristors 21, 22, 23, and 24 while the memory 51 is in its set state, so that the speech paths A – A′ and B – B′ are closed. Resistors 47, 48, 49 and 50 connected between the gates and the cathodes of the thyristors 21, 22, 23 and 24 serve to prevent erroneous firing. This circuit is equivalent to the circuit illustrated in FIG. 2 of the aforementioned copending application and its operation is discussed therein in greater detail.

With this semiconductor speech path switch, however, at least one memory circuit is needed for each cross-point of speech paths and moreover gating current must be kept flowing into the gate of each thyristor during the time required for exchange operation, so that the structure of the switch is complicated, the cost becomes high and the power consumption is considerable. They are the problems left unsolved with this type of semiconductor speech path switch.

Figure 2:
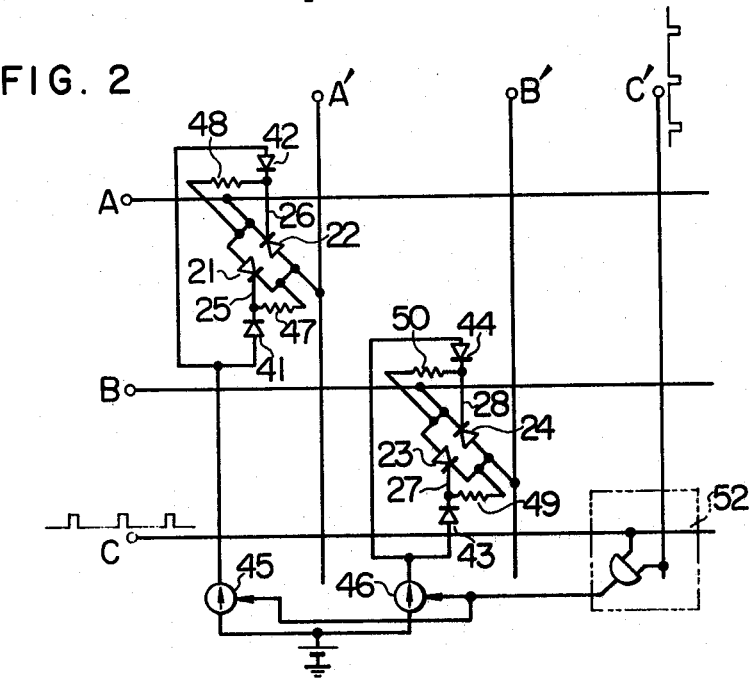
FIG. 2 shows a first embodiment of a semiconductor speech path switch, in the unit thereof, according to the present invention.

The present invention has been made to eliminate such drawbacks. FIG. 2 shows only one balanced type basic unit of a semiconductor speech path switch as one embodiment of the present invention. In like manner, the succeeding embodiments are also shown as constructed in balanced type and there is omitted the depiction and description of the unbalanced type unit throughout the specification and the attached drawings.

In FIG. 2, thyristors 21 and 22 respectively having gates 25 and 26 are connected in inverse parallel configuration between speech paths A and A′ and thyristors 23 and 24 respectively having gates 27 and 28 are connected in the same configuration between speech paths B and B′. The gates 25 and 26 respectively of the thyristors 21 and 22 are connected through diodes 41 and 42 with a gating current circuit 45 which has a high impedance. The diodes 41 and 42 are arranged in order to obviate the problem that would exist if the gates 25 and 26 of thyristors 21 and 22 were connected directly to current circuits 45 and 46, namely; with the application of a voltage between speech paths A and A′, current would flow from the cathode of the thyristor 26 into the gate of the thyristor 25 which would always fire a speech path switch consisting of the thyristors 21 and 22 and make it impossible to control the switch. In addition, current would flow back into the gating current circuit 45. In a similar fashion, diodes 43 and 44 operate in conjunction with gates 27 and 28 of thyristors 23 and 24. Similarly, the gates 27 and 28 respectively of the thyristors 23 and 24 are connected through diodes 43 and 44 with a gating current circuit 46 having a high impedance. Resistors 47, 48, 49 and 50 are connected between the gates and the cathodes of the respective thyristors so as to prevent erroneous firing. A capacitor and a variable resistor are connected with each of the resistors but they are not shown in the figure and the description thereof is also omitted (the same is true for the succeeding embodiments). The gating current circuits 45 and 46 are connected with a selecting circuit 52 which operates according to the logical product of the signals on selection paths C and C′.

Now, the operation of the semiconductor speech path switch will be described. If pulse signals whose repetition periods are synchronized with each other are applied to the selection paths C and C′, as shown in FIG. 2, during the time required for exchange operation, then the selecting circuit 52 is interrupted at a period equal to the pulse repetition rate of the pulse signal. The periodic interruption of the selecting circuit 52 causes the gating current circuits 45 and 46 to deliver pulse currents which are respectively applied to the gates 25 and 26 of the thyristors 21 and 22 and the gates 27 and 28 of the thyristors 23 and 24. Therefore, if the repetition rate of the pulse signal applied to the selection path C or C′ is chosen to be higher than the frequency of the alternating current (ringing signal) flowing through the speech path, the thyristors 21, 22, 23 and 24 are continuously fired to keep the speech paths A and A′, and B and B′ closed since even though the alternating current is periodically interrupted due to its periodical inversion of polarity, the thyristors can be fired again in a very short time by the pulse signals having a higher repetition rate. The reason why the gating current circuit in the previous embodiment has a high impedance is as follows. In the busy condition, the circuit is periodically conductive and if the circuit has not an efficient impedance, the speech signals may leak into another circuit through the gate and the gating current circuit. Moreover, even if the voltage across the thyristor varies from positive to negative or inversely due to the alternating current flowing through the thyristor, the high impedance can reduce the change in the gating current. And there is no problem caused in case where the amplitude or the rate of variation of the gating current is large enough to make the switch operate in response to the current. Usually, a simple constant current circuit may be used as such a gating current circuit. Namely, when pulse signals are selectively applied to the selection paths C and C′ for a short time, the gates of the thyristors draw pulse currents to be turned on and the conductive states of the thyristors continue due to their self-holding actions until they have been cut off due to hooking or the inversion of the voltage polarity of the alternating current. The voltage of the alternating current periodically changes its polarity and once cut off, the thyristor cannot resume its conductive state without a gating signal. Accordingly, no signal current flows through the speech paths until the next arrival of a gating pulse. According to the semiconductor speech path switch of the present invention, the thyristor is turned on through the repeated application of pulses to the gate thereof.

The frequency of the alternating current flowing through the speech paths is 16 Hz and the repetition rate of the dial pulse is about 10 pps or 20 pps and the repetition rate of the gating pulses must be higher than at least the frequency of the alternating current and the pulse repetition rate of the dial pulse. Further, according to the present invention the pulse repetition period of the gating pulse signal is by far longer than the turn-on time (several microseconds) of the thyristor and the pulse width of the gating pulse is 1/(several hundreds) to 1/(several thousands) of the pulse repetition period. Accordingly, the power consumption over the gate control can be very small.

Figure 3:
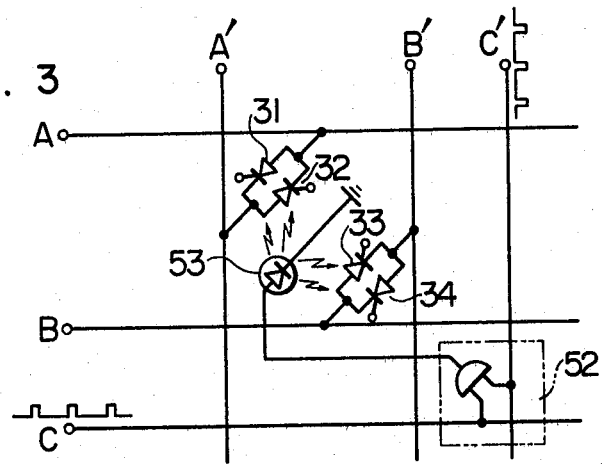
FIG. 3 shows a second embodiment of a semiconductor speech path switch, in the unit thereof, according to the present invention.

FIG. 3 shows a basic structural unit of a semiconductor speech path switch as a second embodiment of the present invention. In FIG. 3, reference numerals 31, 32, 33 and 34 indicate thyristors sensitive to light (such as LASCR). The thyristors 31 and 32, and 33 and 34 are connected in inverse parallel configuration between the speech paths A and A′ and between B and B′. A single luminescent diode 53 is provided for the thyristors 31, 32, 33 and 34. The luminescent diode 53 is connected with a selecting circuit 52 which operates according to the logical product of the signals on selection paths C and C′. The operation of this semiconductor speech path switch is as described below.

When pulse signals whose pulse repetition periods are synchronized with each other are applied to the selection paths C and C′, as shown in FIG. 3, during a time required for exchange operation, the selecting circuit 52 is periodically rendered on and off at the same repetition period as that of the pulse signal. The periodical operation of the selection circuit 52 causes the luminescent diode 53 to emit light energy intermittently at a period equal to that of the pulse signal, which light emission is received by the thyristors 31, 32, 33 and 34. Accordingly, if the pulse repetition rate of the pulse signals is chosen to be higher than the frequency of the alternating current through the speech paths, the thyristors 31, 32, 33 and 34 are kept in continuous conduction to keep the speech paths A - A' and B - B' closed, as in the case of the first embodiment described above. The semiconductor speech path switch shown in FIG. 3 is almost ideal since in this case the speech paths are completely separated electrically from the control circuit.

Figure 4:
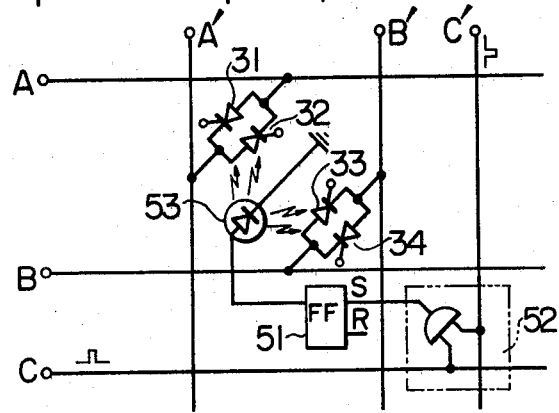
FIG. 4 shows a third embodiment of a semiconductor speech path switch, in the unit thereof, according to the present invention.

FIG. 4 shows a basic structural unit of a semiconductor speech path switch as a third embodiment of the present invention. In FIG. 4, light-sensitive thyristors (such as LASCR) 31 and 32, and 33 and 34 are connected in inverse parallel configuration between speech paths A and A', and B and B'. A single luminescent diode 52 is provided for the thyristors 31, 32, 33 and 34. The luminescent diode 53 is connected with a memory 51 (represented as a flip-flop in the figure), which is in turn connected with a selecting circuit 52 that operates according to the logical product of the signals on selection paths C and C'. The reset circuit for the memory 51 is not shown in the figure. The operation of this semiconductor speech path switch is as described below.

When control pulses are simultaneously applied to the selection paths C and C' as shown in FIG. 4, the selection circuit 52 is operated to set the memory 51. As a result, the luminescent diode 53 continuously supplies light energy for the thyristors 31, 32, 33 and 34 so that even if the current flowing through the speech paths is instantaneously interrupted due to its being alternating current or due to hooking and dialing, the current can flow again very soon. Accordingly, if the memory 51 is in its set state during a time required for exchange operation, the speech paths A - A' and B - B' are kept closed during that time. The luminescent diode 53 here used can be substituted by a plasma panel and in such a case the memory action proper to the plasma panel is brought into play. Further, if a PNPN luminescent diode is substituted for the luminescent diode 53, the memory action of the PNPN diode can be utilized so that the semiconductor speech path switch can be fabricated without the memory 51.

Figure 5:
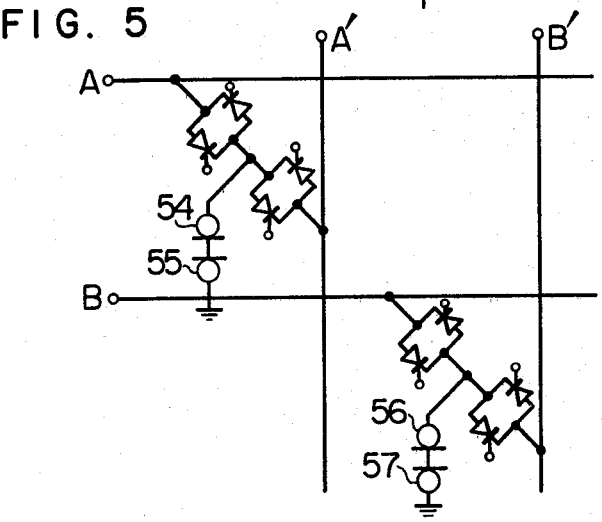
FIG. 5 shows a fourth embodiment of a semiconductor speech path switch, in the unit thereof, according to the present invention.

FIG. 5 shows a basic structural unit of a semiconductor speech path switch as a fourth embodiment of the present invention. In FIG. 5, the control circuit which is the same as that shown in FIG. 2, 3 or 4, is not shown and the description thereof is also omitted.

In the semiconductor speech path switch in FIG. 5, a pair of circuits, each consisting of two thyristors connected in inverse parallel configuration, are connected in series with each other and the junction point of the two parallel circuits is grounded through constant current diodes 54 and 55, or 56 and 57 to reduce crosstalk. The constant current diodes 54 and 55, or 56 and 57 are connected in inverse series with each other so as to obtain the constant current characteristic for both positive and negative voltages. The constant current diode is of low impedance when cut off while it develops a high impedance when conducting. By the use of this property of the diode, that is, by grounding through a low impedance when speech paths are opened, crosstalk is attenuated. When the speech paths are closed, the diodes are of high impedance so that the attenuation will not increase.

As described above, according to the present invention, a plurality of sets of thyristors, each set consisting of thyristors connected in inverse parallel configuration, are arranged in the form of a matrix to provide a balanced or unbalanced type switch and a speech path switch is constituted of semiconductor elements through the provision of control circuits which supply a pulse signal or pulsating light energy whose repetition rate is higher than the frequency of the ac signal sent through the speech paths, for thyristors at each cross-point to be closed, during a time required for exchange operation. With the thus constructed semiconductor speech path switch, the ringing, dialing and hooking signals can be treated together with the speech signal, in the same manner as with the conventional mechanical speech path switch. Moreover, since the gate current or the light energy applied to the thyristors is intermittent, the required power consumption is much smaller than that by the conventional speech path switch. Further, there is no need to provide a memory circuit for each cross-point (that is, no memory circuit is needed) so that the structure of the switch as a whole is simplified and also the cost of the switch is low.

What is claimed is:

1. A semiconductor speech path switch comprising semiconductor switches of gate control type having gate terminals, each being connected between two lines serving as speech paths; constant-current regulated power supplies having high impedances and connected with said gate terminals of said semiconductor switches; and selecting circuits to render said constant-current regulated power supplies on and off, said selecting circuits controlling said constant-current regulated power supplies to intermittently render said constant-current regulated power supplies on and off at a repetition rate higher than the frequency of the current flowing through speech paths so that the speech paths at any desired cross-point may be closed.

2. A semiconductor speech path switch comprising a plurality of semiconductor switches of gate control type having gate terminals, said semiconductor switches being arranged in pairs to allow currents in both positive and negative directions to flow; a plurality of constant-current regulated power supplies having high impedances and capable of being rendered on and off; and selecting circuits to control said constant-current regulated power supplies to be rendered on and off, said semiconductor switches being located at the cross-points of a speech path matrix, each of said semiconductor switches having its gate terminal connected with one of said constant-current regulated power supplies, each of said constant-current regulated power supplies being connected with one of said selecting circuits and said selecting circuits continuously controlling said constant-current regulated power supplies to intermittently render said constant-current regulated power supplies on and off during a period of time required for closing of said speech paths at a repetition rate higher than the frequency of the current flowing through said speech paths so that the speech paths at any desired cross-point may be closed.

3. A semiconductor speech path switch having a plurality of balanced type switch units arranged in the form of a matrix; each unit comprising outgoing speech path lines (A, B) and incoming speech path lines (A',B') and two pairs of thyristors connected in inverse-parallel configuration, each pair of thyristors connected respectively between said lines A and A' and between said lines B and B', two constant-current regulated power supplies having high impedances and capable of being rendered on and off, each constant-current regulated power supply being connected with the gate terminals of said two pairs of thyristors, and a selecting circuit being connected with said two constant-current regulated power supplies, said two constant-current regulated power supplies being associated with said two pairs of thyristors, respectively, and said selecting circuit being capable of intermittently rendering on and off said two constant-current regulated power supplies at a repetition rate higher than the frequency of the alternating current flowing thrugh said speech path lines, wherein desired speech paths at cross-points of said matrix are closed by intermittently rendering the associated one of said two constant-current regulated power supplies on and off during a period of time required for closing of said speech paths at said repetition rate.

4. A semiconductor speech path switch comprising light-sensitive semiconductor switches, each being connected between two lines serving as speech paths; luminescent elements disposed near said semiconductor switches; and selecting circuits to intermittently render said luminescent elements on and off, wherein said selecting circuits control said luminescent elements to intermittently render them on and off at a repetition rate higher than the frequency of the current flowing through speech paths so that the speech paths at any desired cross-point may be closed.

5. A semiconductor speech path switch comprising a plurality of light-sensitive semiconductor switches arranged in pairs to allow currents in both positive and negative directions to flow; a plurality of luminescent diodes; and selecting circuits to intermittently render said luminescent diodes on and off, wherein said semiconductor switches are located at the cross-points of a speech path matrix, each of said luminescent diodes being disposed near and corresponding to one of said cross-points, and said luminescent diodes being respectively connected with said selecting circuits.

6. A semiconductor speech path switch having a plurality of balanced type switch units arranged in the form of a matrix; each unit comprising outgoing speech path lines (A, B) and incoming speech path lines (A', B') and two pairs of light-sensitive thyristors connected in inverse parallel configuration, each thyristor pair connected respectively between said lines A and A' and between said lines B and B', a luminescent diode which is disposed near and corresponding to said two pairs of thyristors, and a selecting circuit which is connected with said luminescent diode and is capable of intermittently rendering said luminescent diode on and off at a repetition rate higher than the frequency of the alternating current flowing through said speech path lines, wherein desired speech paths at the cross-points of said matrix are closed by intermittently rendering the associated luminescent diode on and off during a period of time required for closing of said speech paths.

7. A semiconductor speech path switch comprising light-sensitive semiconductor switches, each being connected between two lines serving as speech paths; luminescent elements disposed near said switches; memory circuits to keep said luminescent elements in their on or off states; and selecting circuits to set and reset said memory circuits, wherein said luminescent elements are rendered on and off by setting and resetting said memory circuits so that the speech paths at any desired cross-point may be closed and opened.

8. A semiconductor speech path switch comprising a plurality of light-sensitive semiconductor switches arranged in pairs to allow currents in both positive and negative directions to flow; a plurality of luminescent diodes; a plurality of memory circuits to render said luminescent diodes on and off; and selecting circuits to set and reset said memory circuits; said semiconductor switches being located at the cross-points of a speech path matrix, each of said luminescent diodes being disposed near each of the cross-points thereof and said luminescent diodes being respectively connected through said memory circuits with said selecting circuits.

9. A semiconductor speech path switch comprising: a plurality of semiconductor switches of gate control type having gate terminals, said semiconductor switches being arranged in pairs to allow currents in both positive and negative directions to flow, said semiconductor switches having a self-holding action by the current flowing therethrough and being inserted in a speech path connecting two points to be communicated to each other; two constant-current regulated power supplies having high impedance, said constant-current regulated power supplies being respectively connected with said gate terminals of said semiconductor switches; and a selecting circuit to render said constant-current regulated power supplies on and off, said selecting circuit controlling said constant-current regulated power supplies to render said constant-current regulated power supplies on and off during a period of time required for closing of said speech path at a repetition rate higher than the frequency of the current flowing through said speech path so that the speech path at said two points may be effectively closed.

10. A semiconductor speech path switch comprising a plurality of light-sensitive semiconductor switches arranged in pairs to allow currents in both positive and negative directions to flow, said semiconductor switches having a self-holding action by the current flowing therethrough and being inserted in a speech path connecting two points to be communicated to each other, a luminescent element disposed near said semiconductor switches and a selecting circuit to render said luminescent element on and off, said selecting circuit controlling said luminescent element to intermittently render said luminescent element on and off during a period of time required for closing of said speech path at a repetition rate higher than the frequency of the current flowing through said speech path so that the speech path at said two points may be effectively closed.

11. A semiconductor speech path switch comprising a plurality of light-sensitive semiconductor switches arranged in pairs to allow currents in both positive and negative directions to flow; a plurality of luminescent diodes, and selecting circuits to render said luminescent diodes on and off, said semiconductor switches being located at the cross-points of a speech path matrix, each of said luminescent diodes being disposed near and corresponding to one of said cross-points, said luminescent diodes being respectively connected with said selecting circuits, and said selecting circuits continuously controlling said luminescent diodes to intermittently render said luminescent diodes on and off during a period of time required for closing of said speech paths at a repetition rate higher than the frequency of the current flowing through said speech paths so that the speech paths at any desired cross-point may be effectively closed.

12. A semiconductor speech path switch as claimed in claim 2, wherein said plurality of semiconductor switches include a plurality of pairs of thyristors, each of said pairs consisting of two thyristors, each of said pairs consisting of two thyristors which are in inverse parallel connection to each other.

13. A semiconductor speech path switch as claimed in claim 5, wherein said plurality of light-sensitive semiconductor switches include a plurality of pairs of light-sensitive thyristors, each of said pairs consisting of two light-sensitive thyristors in inverse parallel connection to each other.

14. A semiconductor speech path switch as claimed in claim 8, wherein said plurality of light-sensitive semiconductor switches include a plurality of pairs of light-sensitive thyristors, each of said pairs consisting of two light-sensitive thyristors in inverse parallel connection to each other.

15. A semiconductor speech path switch having a plurality of balanced type switch units arranged in the form of a matrix;

each balanced type switch unit comprising outgoing speech path line pairs and incoming speech path line pairs and two pairs of light-sensitive thyristors connected in inverse parallel configuration, each thyristor pair connected respectively between an outgoing speech path line and an incoming speech path line, a luminescent diode disposed near and corresponding to said pairs of thyristors, and a memory circuit to render said luminescent diode on and off, and a selecting circuit to set and reset said memory circuit which is associated with two selecting paths being connected with said luminescent diode, wherein desired speech paths at cross-points of said matrix are closed by rendering the associated luminescent diode on during a period of time when closing of said speech paths is required.

16. A semiconductor speech path switch comprising plural pairs of light-sensitive thyristors connected in inverse-parallel configuration, each being connected between two lines serving as speech paths; luminescent elements disposed near said plural pairs of light-sensitive thyristors, and selecting circuits to intermittently render said luminescent elements on and off, wherein said selecting circuits control said luminescent elements to intermittently render them on and off at a repetition rate higher than the frequency of the current flowing through speech path so that the speech paths at any desired cross-point may be closed.

17. A semiconductor speech path switch as claimed in claim 2, wherein the gate terminal of each of said semiconductor switches is supplied with current from one of said constant current regulated power supplies through a separate forward biased diode.

* * * * *